(12) United States Patent
Seenappa et al.

(10) Patent No.: US 10,212,232 B2
(45) Date of Patent: Feb. 19, 2019

(54) METHOD AND APPARATUS FOR MANAGING DATA COMMUNICATIONS USING COMMUNICATION THRESHOLDS

(71) Applicant: AT&T INTELLECTUAL PROPERTY I, LP, Atlanta, GA (US)

(72) Inventors: Vikram Seenappa, Sammamish, WA (US); Rajendra Prasad Kodaypak, Sammamish, WA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 161 days.

(21) Appl. No.: 15/172,606

(22) Filed: Jun. 3, 2016

(65) Prior Publication Data
US 2017/0353556 A1    Dec. 7, 2017

(51) Int. Cl.
*H04W 72/10* (2009.01)
*H04L 29/08* (2006.01)
*H04W 88/16* (2009.01)
*G06F 9/455* (2018.01)

(52) U.S. Cl.
CPC .............. *H04L 67/12* (2013.01); *H04L 67/10* (2013.01); *H04L 67/322* (2013.01); *H04W 72/10* (2013.01); *G06F 9/45558* (2013.01); *H04W 88/16* (2013.01)

(58) Field of Classification Search
CPC .................. H04L 67/12; H04W 72/10; G06F 2009/45595; G06F 9/45558
See application file for complete search history.

(56) References Cited

U.S. PATENT DOCUMENTS

| | | | |
|---|---|---|---|
| 8,984,113 B2 | 3/2015 | Li et al. | |
| 8,989,091 B2 | 3/2015 | Hedman et al. | |
| 9,292,832 B2 | 3/2016 | Goel et al. | |
| 9,752,840 B1 * | 9/2017 | Betro ................... | H04W 4/029 |

(Continued)

FOREIGN PATENT DOCUMENTS

| | | |
|---|---|---|
| EP | 2525511 A2 | 11/2012 |
| GB | 2493722 B | 11/2013 |

(Continued)

OTHER PUBLICATIONS

Gubbi, Jayavardhana et al., Internet of Things (IoT): A vision, architectural elements, and future directions. Future Generation Computer Systems 29.7 (2013): 16451660., 2013.

(Continued)

*Primary Examiner* — Jeong S Park
(74) *Attorney, Agent, or Firm* — Guntin & Gust, PLC; Robert Gingher

(57) ABSTRACT

Aspects of the subject disclosure may include, for example, allocating virtual network function resources for a wireless connection with a gateway device, facilitating establishing the wireless connection with the gateway device utilizing the virtual network function resources to provide for transmitting of data from the gateway device to an application server where the data is stored by the gateway device until a determination is made that a threshold associated with the data has been satisfied, and tearing down the virtual network function resources responsive to a determination that the transmitting of the data from the gateway device to the application server via the wireless connection has been completed. Other embodiments are disclosed.

20 Claims, 8 Drawing Sheets

(56) References Cited

U.S. PATENT DOCUMENTS

| | | | |
|---|---|---|---|
| 2004/0253926 A1* | 12/2004 | Gross | G08C 17/00 |
| | | | 455/67.11 |
| 2011/0213871 A1 | 9/2011 | DiGirolamo et al. | |
| 2013/0225130 A1 | 8/2013 | Rost et al. | |
| 2013/0227653 A1 | 8/2013 | Choi et al. | |
| 2013/0346469 A1* | 12/2013 | Dalal | H04L 41/12 |
| | | | 709/201 |
| 2014/0003339 A1 | 1/2014 | Jain et al. | |
| 2014/0241354 A1 | 8/2014 | Shuman et al. | |
| 2014/0242940 A1 | 8/2014 | Koo et al. | |
| 2014/0244834 A1 | 8/2014 | Guedalia et al. | |
| 2014/0359131 A1 | 12/2014 | Seed et al. | |
| 2015/0006719 A1 | 1/2015 | Gupta et al. | |
| 2015/0142963 A1 | 5/2015 | Choi et al. | |
| 2015/0249672 A1 | 9/2015 | Burns et al. | |
| 2015/0293951 A1* | 10/2015 | Yamasaki | G10L 25/51 |
| | | | 707/738 |
| 2015/0381776 A1 | 12/2015 | Seed et al. | |
| 2016/0006815 A1 | 1/2016 | Dong et al. | |
| 2016/0103698 A1* | 4/2016 | Yang | G06F 11/202 |
| | | | 714/4.11 |
| 2016/0128043 A1 | 5/2016 | Shuman et al. | |
| 2016/0135241 A1 | 5/2016 | Gujral et al. | |
| 2017/0171091 A1* | 6/2017 | Nayak | H04L 47/25 |
| 2017/0214612 A1* | 7/2017 | Leitner | H04L 45/586 |
| 2017/0257276 A1* | 9/2017 | Chou | H04L 41/0823 |
| 2018/0262410 A1* | 9/2018 | Chou | G06F 9/45558 |

FOREIGN PATENT DOCUMENTS

| | | |
|---|---|---|
| KR | 101566957 | 11/2015 |
| KR | 101584176 | 1/2016 |
| WO | 2013123445 A1 | 8/2013 |
| WO | 2013142139 A2 | 9/2013 |
| WO | 2013148671 A1 | 10/2013 |
| WO | 2015031750 A1 | 3/2015 |
| WO | 2015120352 | 8/2015 |
| WO | 2016036469 | 3/2016 |
| WO | 2016051237 | 4/2016 |

OTHER PUBLICATIONS

Husain, Syed et al., Recent trends in standards related to the internet of things and machine to machine communications. Tsp 4.S6m (2014), 2014.

Laya, Andres et al., Is the random access channel of LTE and LTEA suitable for M2M communications? A survey of alternatives. Communications Surveys and Tutorials, IEEE 16.1 (2014): 416., 2014.

Zhang, Ran et al., Probabilistic Analysis on QoS Provisioning for Internet of Things in LTEA Heterogeneous Networks with Partial Spectrum Usage. (2012)., 2012.

Zheng, Kan et al., Radio resource allocation in LTEadvanced cellular networks with M2M communications. Communications Magazine, IEEE50.7 (2012): 184192., 2012.

* cited by examiner

200

300

METHOD AND APPARATUS FOR MANAGING DATA COMMUNICATIONS USING COMMUNICATION THRESHOLDS

FIELD OF THE DISCLOSURE

The subject disclosure relates to a method and apparatus for managing data communications using communication thresholds.

BACKGROUND

Internet of Things (IoT) is expected to become a major revolution in the communications industry. The rate of connected devices are scaling exponentially and by 2025 it is forecasted (Machina Research, May 2015) that there will be a total of 30 billion Machine-to-Machine (M2M) connected devices.

IoT technology may introduce a new paradigm with various requirements such as non-real time applications, low-mobility, low data throughput, reliable connectivity, long battery life, on demand resource scaling, service chaining and so forth that could potentially vary widely based on targeted service requirements. Mobile IoT devices and their aggregator gateways can be located in various locations like industrial areas, remote areas or dense urban areas and thus may desire a reliable backhaul that can transport aggregated data traffic to back-end servers.

BRIEF DESCRIPTION OF THE DRAWINGS

Reference will now be made to the accompanying drawings, which are not necessarily drawn to scale, and wherein.

DETAILED DESCRIPTION

Figure 1:
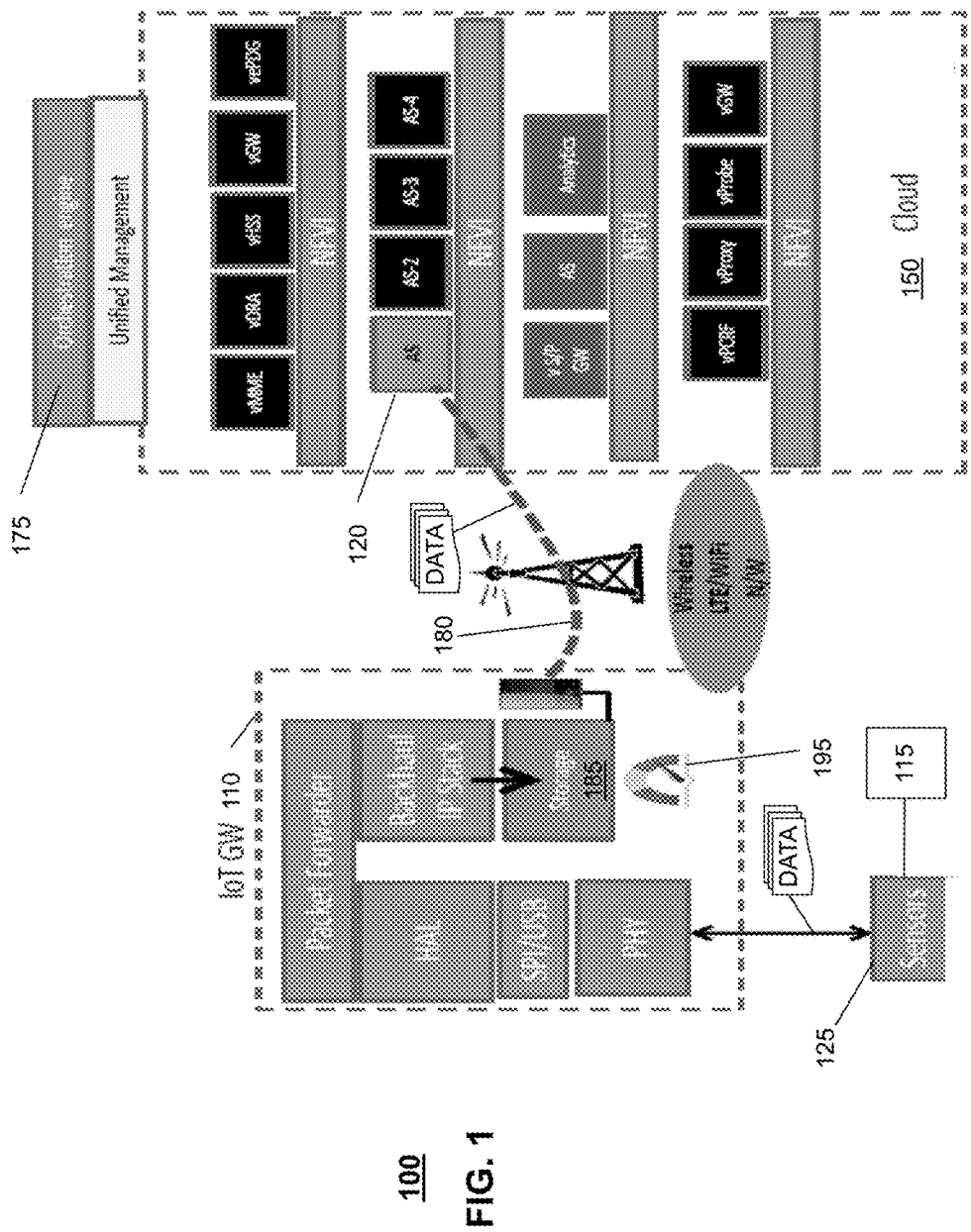
FIGS. 1-4 depict illustrative embodiments of systems for providing data communications from end devices to recipient devices such as applications servers.

The subject disclosure describes, among other things, illustrative embodiments for communicating data. Communication devices can provide the data (e.g., sensory information) to a gateway device that can aggregate and/or store the data for transmitting, such as delivery to an application server or other recipient device(s). The communication of the aggregated data between the gateway device and the application server can be managed intelligently and dynamically based on triggers and/or selective establishment of a wireless connection(s).

In one or more embodiments, network function virtualization can be performed via allocating virtual network function resources in order to manage the communication of the aggregated data from the gateway device to the application server. A virtual network function can take on the responsibility of specific network functions that run on one or more virtual machines on top of hardware networking infrastructure. One or more of the exemplary embodiments can utilize individual virtual network functions that are connected or combined together as building blocks to offer a full-scale networking communication service for transmitting data from the gateway device(s) to the application server(s) or other recipient device(s). Other embodiments are described in the subject disclosure.

One or more aspects of the subject disclosure include a gateway device having a processing system including a processor; and a memory that stores executable instructions that, when executed by the processing system, facilitate performance of operations. The gateway device can receive data from a group of communication devices, where the data includes sensor information captured by sensors of the group of communication devices. The gateway device can determine whether the data is time-sensitive and can, responsive to a determination that the data is not time-sensitive, store the data in the memory. The gateway device can, responsive to a determination that a threshold associated with the receiving and storing of the data has been satisfied, transmit the data over a wireless connection to an application server, where the wireless connection is established by a network device by setting up allocated virtual network function resources for the wireless connection, and where the network device tears down the allocated virtual network function resources responsive to a completion of the transmitting of the data.

One or more aspects of the subject disclosure is a method that includes allocating, by a processing system including a processor, virtual network function resources for a wireless connection with a gateway device. The method includes facilitating establishing, by the processing system, the wireless connection with the gateway device utilizing the virtual network function resources to provide for transmitting of data from the gateway device to an application server, where the data includes sensor information captured by sensors of a group of communication devices that communicated the sensor information to the gateway device, and where the data is stored by the gateway device until a determination is made that a threshold associated with the data has been satisfied. The method includes tearing down, by the processing system, the virtual network function resources responsive to a determination that the transmitting of the data from the gateway device to the application server via the wireless connection has been completed.

One or more aspects of the subject disclosure include a machine-readable storage medium, including executable instructions that, when executed by a processing system including a processor, facilitate performance of operations. The processing system can receive data from a group of communication devices and can determine whether the data is time-sensitive. The processing system can, responsive to a determination that the data is not time-sensitive, store the data in a memory. The processing system can, responsive to a determination that a threshold associated with the receiving and storing of the data has been satisfied, transmit the data over a wireless connection to an application server, where the wireless connection is established by a network device by allocating virtual network function resources for the wireless connection, and where the network device tears down the virtual network function resources responsive to a determination that the transmitting of the data has been completed.

FIG. 1 depicts an illustrative embodiment of a system 100 that enables communicating data from an aggregator or other collection device, such as a gateway device 110 (e.g., an IoT gateway). The data can be received from various communication devices 115 (only one of which is shown). The communication devices 115 can be various types of devices capable of collecting and exchanging data including physical objects such as appliances, vehicles, buildings and other items that are embedded with or otherwise include electronics, software, sensors and/or network connectivity that enable these objects to collect and exchange data. For example, the communication devices can include smart appliances, utility meters, or other M2M devices, as well as end user devices and so forth. In one or more embodiments, the communication devices 115 can include one or more sensors 125 that capture data and transmit the captured data to the gateway device 110. The data can be various types of data including sensed information, metrics, performance information, instructions, alerts, requests, responses, text, images, video, audio, or any other type of information that a communication device can communicate, e.g., M2M communications.

In one embodiment, the gateway device 110 can receive the data from the communication devices 115 and/or the sensors 125 by way of a Low-Power Wide-Area Network (LPWAN) or Low-Power Network (LPN) network that allows long range communications at a low hit rate. In another embodiment, the data can be transmitted to the gateway device 110 via a Long Range WAN (LoRaWAN). Various other types of networks and/or protocols, as well as combinations of networks and/or protocols, can be utilized for providing data to the gateway device 110 from numerous communications devices 115, including Haystack, NB-IOT, LTE-MTC, NB-Fi Protocol and others.

System 100 provides for data (e.g., non-time-sensitive data) to be collected and stored at the gateway device 110, such as utilizing memory or storage device 185, and then the non-time-sensitive data can be transmitted at a later time for a more efficient use of network resources. In one embodiment, the gateway device 110 can determine whether data received from a communication device 115 is time sensitive data. For instance, the data can include metadata that indicates whether or not the data is time sensitive (or a level of time sensitivity). In another example, the gateway device 110 can analyze the data (e.g., a header of the data packet(s) and/or the payload of the data packet(s)) to determine whether or not the data is time sensitive (or a level of time sensitivity). If the data is time sensitive then it can be transmitted to its destination (e.g., via a pre-configured backhaul connection such as a terrestrial backhaul). If the data is not time sensitive then it can be stored in the storage device 185.

In one embodiment, the data collected by the gateway device 110 can be transmitted to an application server 120 according to a triggering event. In another embodiment, the application server 120 can be part of a network cloud architecture 150 that utilizes virtual machines (VMs). As an example, the network cloud architecture 150 can include an orchestration engine 175 that allows for setting up or allocating virtual network function resources for establishing a wireless connection 180. For instance, network functions virtualization and/or software defined networking techniques can be utilized for selectively providing a wireless connection(s). The cloud-based platform of architecture 150 can facilitate dynamic and rapid applications delivery environments and can provide a path to migrate custom built networking gear into next generation cloud-centric mobility data centers.

In one embodiment, orchestration engine 175 can instantiate various cloud network resources such as a virtual Mobility Management Entity (vMME), a virtual Serving and PDN Gateway (vS-P GW), a virtual Home Subscriber Server (vHSS), a virtual Diameter Routing Agent (vDRA), an evolved Packet Data Gateway (ePDG) VMs, Application Server VMs, Analytics and Probing VMs and other resources that facilitate communication services associated with the collected data. The instantiation of the network resources by orchestration engine 175 can result in establishing the wireless connection 180 for delivery of the data to the application server 120 (or to another recipient device(s)). Other virtual and/or non-virtual resources can be utilized for facilitating communication services for the collected data, in place of or in addition to the above-described network resources of architecture 150.

In one or more embodiments, the instantiation of the network resources by orchestration engine 175 to establish the wireless connection 180 and/or the transmitting of the data via the wireless connection 180 can be responsive to one or more triggering events. For example, the receiving and/or storing of the data by gateway device 110 can be monitored and a threshold analysis can be performed to determine if a triggering event(s) has occurred. The threshold can be based on various criteria including storage capacity, Input/Output Operations Per Second (IOPS) metrics, and so forth. Other factors can also be utilized in determining if a triggering event has occurred (to cause establishing the wireless connection and/or transmitting of the data to the application server 120) such as a type of data being stored, network conditions, time of day, scheduled maintenance, capabilities and/or workload of the gateway device 110, capabilities and/or workload of the application server 120 (or other recipient device), and so forth. These other factors utilized in determining if the triggering event has occurred can be actual measurements and/or predicted metrics. In one or more embodiments, the various factors can be weighted according to network conditions or other criteria.

The monitoring and/or determining of the triggering event can be performed by the gateway device 110 (e.g., via monitoring engine 195) and/or can be performed by the orchestration engine 175 (e.g., based on capacity data transmitted from the gateway device 110 to the orchestration engine). In one embodiment, the triggering event can be multiple triggering events, such as monitoring to determine whether any one of a storage capacity threshold, an IOPS threshold and a network traffic threshold has been satisfied and transmitting the data responsive to any of these three thresholds being satisfied. In another embodiment, multiple thresholds may need to be satisfied to trigger the transmitting of the data, such as monitoring for satisfying a storage capacity threshold and a network traffic threshold and transmitting the data only when both thresholds have been satisfied. In another embodiment, combinations of single and multiple thresholds can be utilized as the triggers, such as monitoring for satisfying a maximum storage capacity threshold, a minimum storage capacity threshold and a network traffic threshold, and then transmitting the data when both the minimum storage capacity and network traffic thresholds have been satisfied, as well as transmitting the data any time the maximum storage capacity threshold has been satisfied.

In one embodiment, the establishing of the wireless connection 180 can be performed responsive to a triggering event. For example, the orchestration engine 175 can instantiate the network resources (e.g., the vS-P GW and so forth) to establish the wireless connection 180 responsive to a first trigger (e.g., 60% storage capacity) and the data can be transmitted over the wireless connection 180 responsive to a second trigger (e.g., 80% storage capacity). In one embodiment, the percentage for the first and/or second storage capacity thresholds can be adjusted (e.g., by the orchestration engine 175 and/or the gateway device 110 according to various factors, such as network conditions, type of data, a level of time sensitivity for the data, available resources, and so forth. In the above-example, the first and second triggers were of the same type (i.e., storage capacity), however, the first and second triggers can be of different types, such as storage capacity, IOPS, and so forth. In one embodiment, the first trigger can be multiple first triggers (which singularly can trigger the instantiation of the network resources or must be simultaneously satisfied to trigger the instantiation). In another embodiment, the second trigger can be multiple second triggers (which singularly can trigger the transmitting of the data from the gateway device 110 or must be simultaneously satisfied to trigger the data transmission).

In another embodiment, a time-based trigger(s) can be used in place of or in conjunction with another trigger(s). For example, the orchestration engine 175 can monitor for a first trigger of a 60% storage capacity to instantiate the network resources for the wireless connection 180 and can monitor for a second trigger of an 80% storage capacity for transmitting the data over the wireless connection 180. However, the instantiation of the network resources and/or the transmitting of the data may occur prior to the first and/or second triggers being satisfied if a time-based triggering event occurs, such as a policy that requires a particular type of data to be transmitted within 8 hours of being received by the gateway device 110.

System 100 can provide an intelligent object-based data collection and storage monitoring mechanism for traffic aggregated at one or more IoT GW nodes, such as gateway device(s) 110. Data monitoring and threshold alerting can be performed based on systemic attributes to drive the orchestration engine 175 to setup dynamic resources (e.g., virtual functions) that can provision a regular and/or secure network backhaul and thus service chain the required core network elements with the gateway device 110 to establish the connectivity for successful data transport.

In one embodiment, the orchestration engine 175 can instantiate the virtual network resources prior to an LTE/WiFi PDN setup to transfer the data based on IOPS and/or storage bandwidth triggers and can then tear down the virtual network resources responsive to the LTE/WiFi PDN being released.

In one embodiment, mobile data traffic emanating from cell-sites that serve millions of users, as well as current and next-generation of M2M/IoT devices across various radio access technologies, can be intelligently transported to their respective back-end systems in a more cost-effective manner via system 100. System 100 can enable reducing or avoiding (selectively or otherwise) the use of a dedicated backhaul (e.g., fiber, satellite, high-speed Gb/s ethernet) such as the one used for traditional cellular technologies which can be nodes. Gateway devices 110 can be strategically deployed in large volumes depending on density of IoT device connections forecasted in a given geographical area, and on-demand network backhaul orchestration mechanisms as in system 100 can result in a large cost-benefit to service providers as well as facilitating a rapid roll-out of low-cost gateway devices 110 for new IoT services.

In one embodiment, system 100 can provide for IoT gateways with local storage (e.g., object/volume) which is used as a buffer with IOPS and/or storage bandwidth triggers for delivery of IoT traffic to an application server. In another embodiment, system 100 can provide intelligent and dynamic network resources selection based on a trigger(s) received from storage buffer usage and monitoring. In one embodiment, system 100 can provide for prioritizing (e.g., by the orchestration engine 175) the data objects and associated triggers received from several IoT GW nodes (e.g., gateway devices 110) communicating at or near the same time. In one embodiment, system 100 provides for LTE PDN connectivity over an LTE Wireless backhaul for non-real time and delay-tolerant IoT traffic.

In one embodiment, system 100 provides LTE PDN connectivity over an LTE Wireless backhaul to be used as a backup transport network when a primary (e.g., terrestrial) network fails or is determined to have an undesired condition (e.g., network congestion, network resource overuse, and so forth). In one embodiment, system 100 can provide IoT on-demand service orchestration of dedicated S-P GW VNF, Application Server VM and Analytics VM prior to PDN network setup over LTE Wireless backhaul. In another embodiment, system 100 can provide IoT on-demand service orchestration of dedicated S-P GW VNF, Application Server VM and Analytics VM prior to PDN network setup over LTE-Unlicensed (LAA) Wireless backhaul. In one embodiment, system 100 can provide IoT on-demand service orchestration of dedicated ePDG VNF, Application Server VM and Analytics VM prior to PDN network setup over WiFi Wireless backhaul.

System 100 allows the orchestration engine 175 to tear down the allocated virtual resources when the PDN connection on LTE, LTE-Unlicensed and/or WiFi connections are to be released (e.g., the data transmitting has been completed) so that these virtual resources can be re-instantiated or reallocated for other on-demand applications and services (including other IoT data communications).

Figure 2:
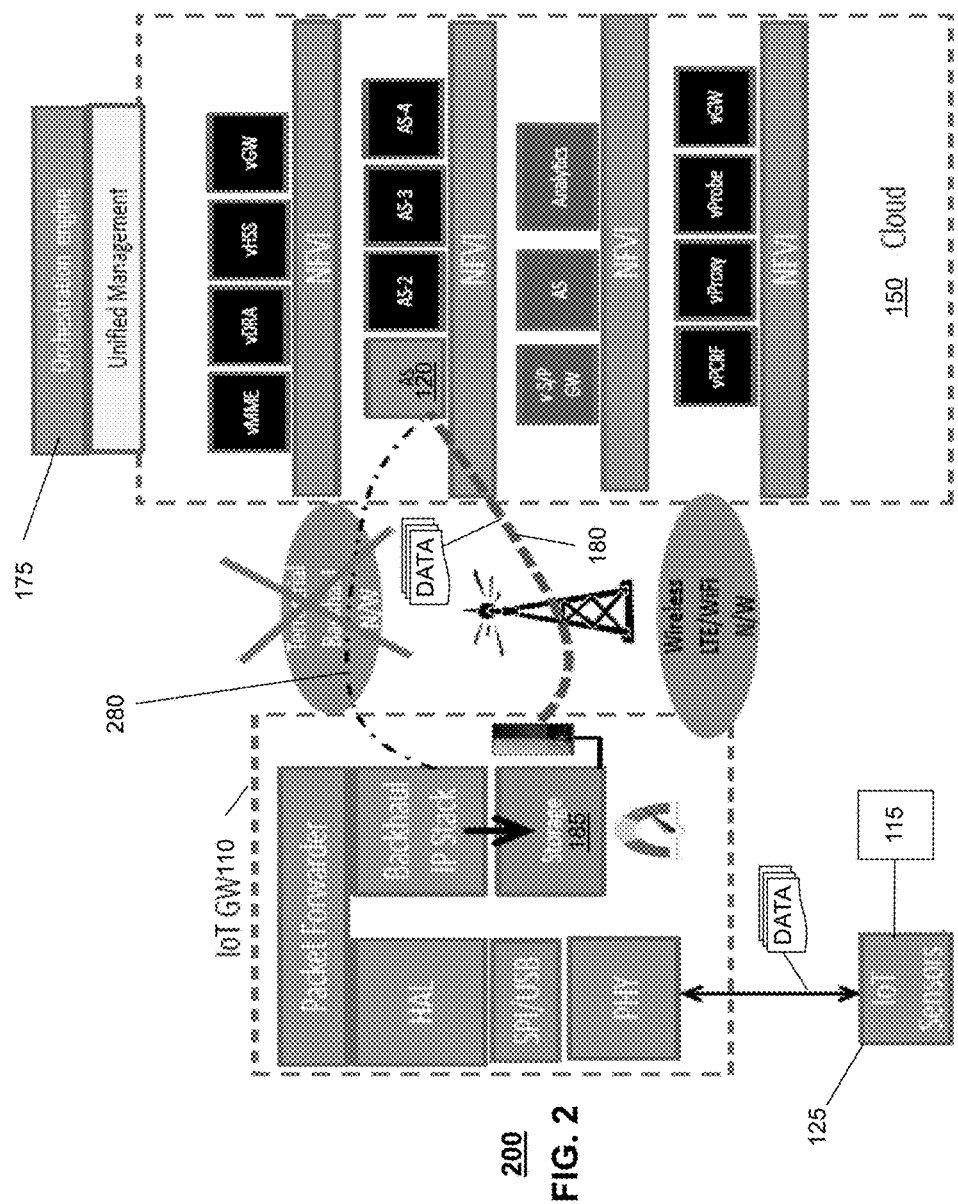

FIG. 2 depicts an illustrative embodiment of a system 200 that enables communicating data from an aggregator or other collection device, such as the gateway device 110 (e.g., an IoT gateway). Similar to system 100, data can be received from various communication devices 115 (only one of which is shown) and/or various sensors 125, and stored at storage 185 for delivery to application server 120 of cloud architecture 150 via wireless connection 180.

System 200 provides for monitoring and detection of an undesired network condition associated with a primary backhaul for the collected data. For example, the orchestration engine 175 can detect that a terrestrial backhaul 280 (or other primary backhaul) has failed or is otherwise unavailable for use (or it is undesirable to use the backhaul such as due to congestion and so forth). Based on detecting the undesired condition, system 200 provides for the data to be transmitted via wireless connection 180. Similar to system 100, wireless connection 180 can be established via network functions virtualization by allocating virtual network function resources for establishing the wireless connection 180.

In one embodiment, the orchestration engine 175 can send instructions to the gateway device 110 to store the aggregated device responsive to the detection of the undesired condition associated with the primary backhaul 280. In another embodiment, one or more triggering events can be utilized for the instantiation of the network resources by orchestration engine 175 to establish the wireless connection 180 and/or the transmitting of the data via the wireless connection 180 to the application server 120 (or other recipient device(s)). In one embodiment, the orchestration engine 175 can monitor the primary backhaul 280 and can instruct the gateway device 110 to return to transmitting data over the primary backhaul once the undesired condition is removed.

In one embodiment of system 200, the orchestration engine 175 can selectively switch between utilizing the wireless connection 180 and utilizing the backhaul connection 280. For example, the gateway device 110 can aggregate and store the data at storage device 185. One or more triggering events can be monitored to determine when the stored data is to be transmitted, such as described with respect to system 100. The orchestration engine 175 can also determine which of the connections (primary backhaul 280 or wireless connection 180) is a preferred mode of delivery for the particular data, such as based on network conditions, type of data, time of day, service agreements, quality of service, and so forth. The data can then be transmitted in whole or in part over the preferred connection.

In one embodiment, the gateway device 110 can separate data based on time sensitivity. For example, a first subset of the data that is deemed time-sensitive can be transmitted immediately or within a particular time period via the primary backhaul 280 while a second subset of the data that is deemed not to be time sensitive can be stored at storage device 185 and transmitted responsive to a triggering event(s), such as a storage capacity and/or IOPS threshold. The second subset of data can be transmitted via the wireless connection 180.

Figure 3:
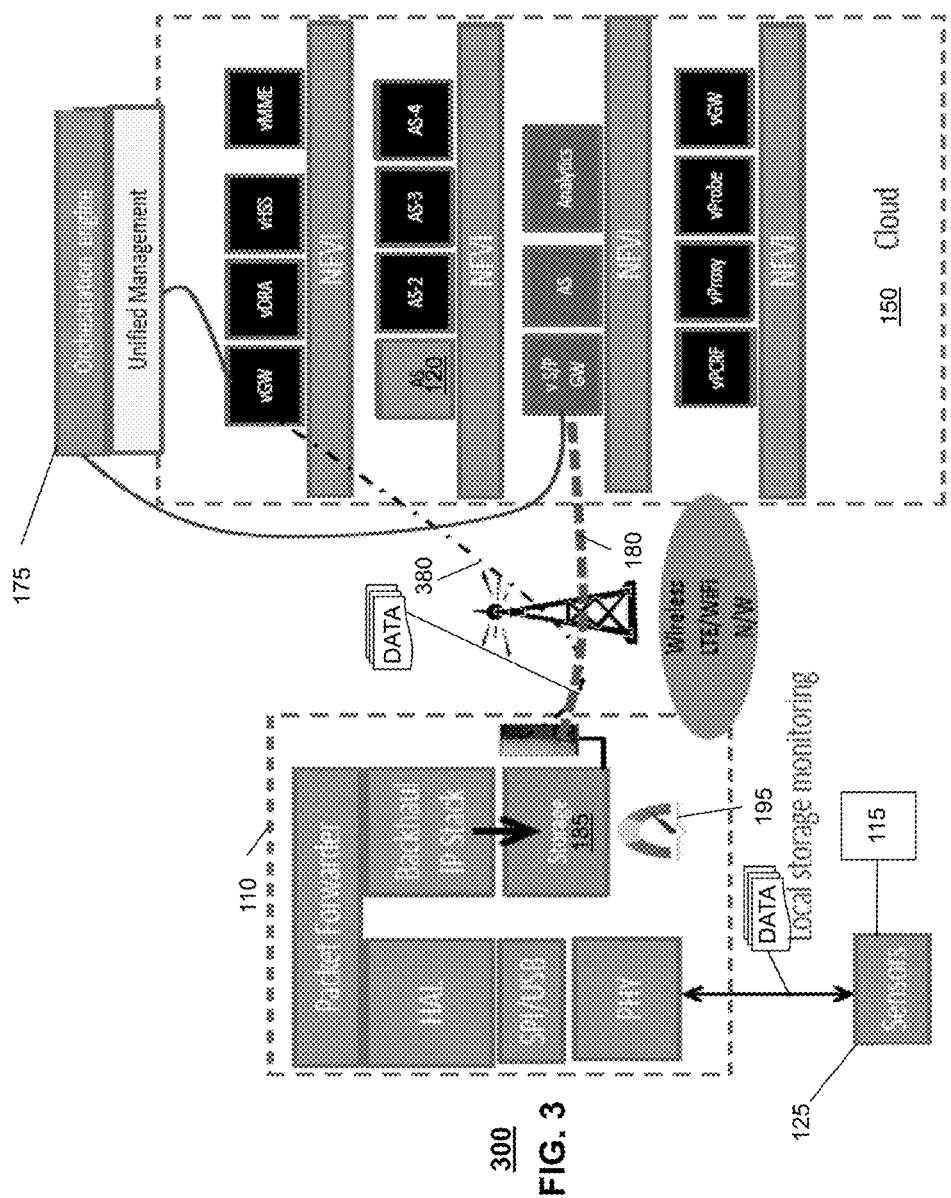

FIG. 3 depicts an illustrative embodiment of a system 300 that enables communicating data from an aggregator or other collection device, such as the gateway device 110 (e.g., an IoT gateway). Similar to system 100, data can be received from various communication devices 115 (only one of which is shown) and/or various sensors 125, and stored at storage 185 for transmitting to a recipient device, such as application server 120 of cloud architecture 150 via wireless connection 180.

System 300 provides for local monitoring associated with a triggering event(s) via monitoring engine 195. In this example, the triggering event can be based on a storage capacity threshold, such as a first threshold for instantiation of the network resources by orchestration engine 175 to establish the wireless connection 180 and a second threshold for the transmitting of the data via the wireless connection 180, such as through use of a vS-P GW. In one embodiment, the gateway device 110 can transmit information (e.g., storage information, a determination that a storage threshold has been satisfied, and so forth) to the orchestration engine 175 via a connection 380. Based on the transmitted information, the orchestration engine 175 can determine whether one or more thresholds have been satisfied and whether the instantiation of the network resources and/or the transmitting of the data should commence.

Figure 4:
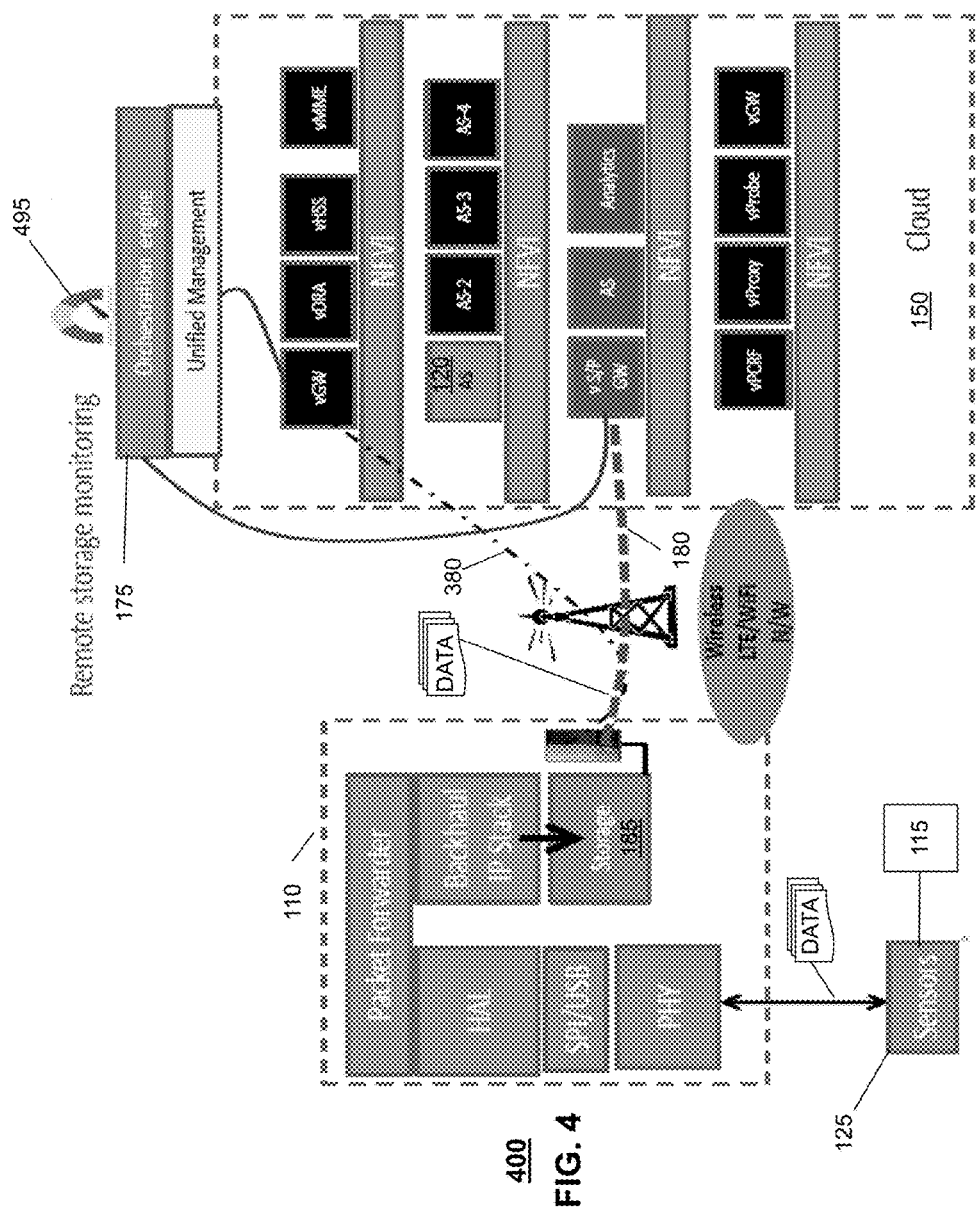

FIG. 4 depicts an illustrative embodiment of a system 400 that enables communicating data from an aggregator or other collection device, such as the gateway device 110 (e.g., an IoT gateway). Similar to system 100, data can be received from various communication devices 115 (only one of which is shown) and/or various sensors 125, and stored at storage 185 for transmitting to a recipient device, such as application server 120 of cloud architecture 150 via wireless connection 180.

System 400 provides for remote monitoring associated with a triggering event(s) via monitoring engine 495. In this example, the triggering event can be based on a storage capacity threshold, such as a first threshold for instantiation of the network resources by orchestration engine 175 to establish the wireless connection 180 and a second threshold for the transmitting of the data via the wireless connection 180, such as through use of a vS-P GW. In one embodiment, the gateway device 110 can transmit information (e.g., storage information, IOPS data, type of data being stored, received metadata associated with the data, and so forth) to the orchestration engine 175 via the connection 380. Based on the transmitted information, the orchestration engine 175 can determine whether one or more thresholds have been satisfied and whether the instantiation of the network resources and/or the transmitting of the data should commence.

Systems 100-400 provide for selective establishment of a wireless connection for transmitting aggregated and stored data at a time that is determined to be most appropriate, such as based on storage capacity of the gateway device 110, IOPS threshold, and so forth. These exemplary systems can reduce or avoid using a pre-configured high-speed LTE wireless backhaul for IoT which may not be a viable technique as IoT traffic is sporadic and bursty in nature and each time setting up a LTE/WiFi PDN would not be feasible from a network resource perspective.

One or more of the exemplary embodiments can use local storage at an IoT GW, can write the IoT traffic feed from a large amount of sensor networks to the local storage, and can utilize IOPS threshold to setup a LTE/WiFi PDN to transport the bulk volume of IoT traffic back to an application server(s) through S-P GWs/ePDGs. One or more of the exemplary embodiments can mitigate disaster scenarios in a hybrid transport network mode of operation where if a primary terrestrial network fails, the IoT GW can write delay tolerant sensor traffic into local memory and can then trigger an LTE/WiFi PDN connection setup to transfer the bulk IoT traffic volume back to an IoT application server.

One or more of the exemplary embodiments can prioritize aggregated traffic from certain IoT GW nodes over traffic from other nodes with suitable tagging to ensure the orchestration engine 175 takes such intelligence into account when setting up PDN connections across the available access technologies (ex: LTE and WiFi are both available but may choose either one based on demand, utilization, availability and/or application needs). One or more of the exemplary embodiments provide efficient and alternative options to use LTE network resources for mobile IoT data transport without causing significant impacts on LTE and cloud network resources. One or more of the exemplary embodiments can provide rapid services delivery utilizing industry-standard data center storage monitoring and intelligent alerting to trigger on-demand dynamic data transport for delay tolerant IoT applications.

Figure 5:
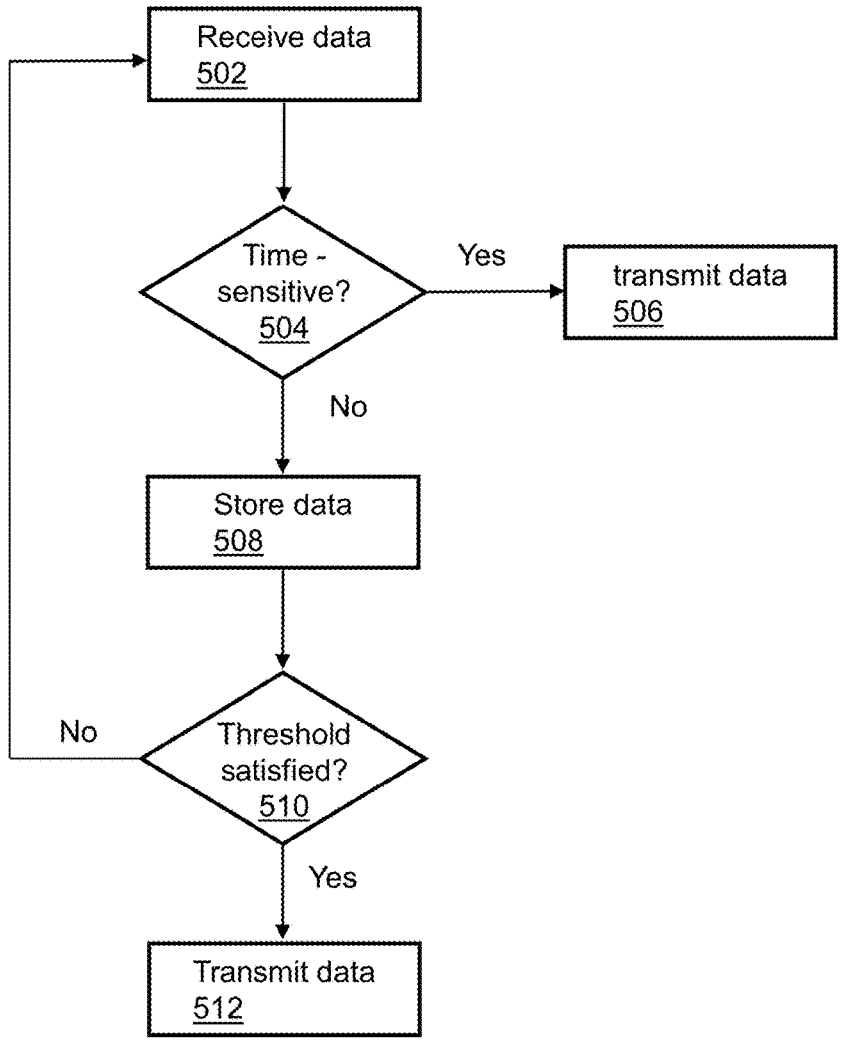
FIG. 5 depicts an illustrative embodiment of a method used in portions of the systems described in FIGS. 1-4.

FIG. 5 depicts an illustrative embodiment of a method 500 used by one or more of systems 100-400 for managing communication of data from a gateway device or other device that receives data such as IoT traffic.

At 502, a gateway device or other device that aggregates data from communication devices (e.g., IoT devices) can receive data. In one embodiment, the data can include sensor information captured by sensors of the communication devices. At 504, a determination can be made as to whether the data is time-sensitive. In one embodiment at 506, time-sensitive data can be immediately (or within a particular time period) transmitted to a recipient device, such as application server 120. For instance, the time-sensitive data can be transmitted via a primary backhaul connection.

At 508, responsive to a determination that the data is not time-sensitive, the data can be stored in a memory accessible to the gateway device, such as a local storage device. At 510, a threshold analysis can be applied to the data. At 512, responsive to a determination that a threshold associated with the receiving and/or storing of the data has been satisfied, the data can be transmitted over a wireless connection to a recipient device, such as application server 120. In one embodiment, the wireless connection can be established by a network device (e.g., orchestration engine 175) by setting up allocated virtual network function resources for the wireless connection. In another embodiment, the network device can tear down (or otherwise release) the allocated virtual network function resources responsive to a completion of the transmitting of the data.

In one embodiment, the data can include groups of the data, and an order of delivery via the wireless connection for the groups of the data can be prioritized, such as by the gateway device 110. In one embodiment, the determination that the threshold has been satisfied is based on monitoring Input/Output Operations Per Second information. In one embodiment, the allocated virtual network function resources establish a virtual dedicated Serving-Packet Data Network Gateway for the wireless connection. In one embodiment, the allocated virtual network function resources establish a virtual dedicated evolved Packet Data Gateway for the wireless connection, and wherein the wireless connection comprises a WiFi connection. In one embodiment, the receiving the data from the group of communication devices 115 is based on communications according to a Low Power Wide Area Network (LPWAN) specification.

In one embodiment, the gateway device 110 or another device (e.g., the orchestration engine 175) can monitor for an undesired condition associated with a pre-configured connection between the gateway device and the application server 120, where the storing the data in the memory and the transmitting the data over the wireless connection are responsive to a detection of the undesired condition. In one embodiment, the determination that the threshold associated with the receiving and storing of the data has been satisfied is based on an instruction received from the network device (e.g., orchestration engine 175), where the gateway device provides storage capacity data to the network device.

While for purposes of simplicity of explanation, the respective processes are shown and described as a series of blocks in FIG. 5, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Multiple forms of communication services can be offered to communication devices over landline technologies such as those described above. Additionally, communication services can be offered to devices by way of a wireless access base station operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 6:
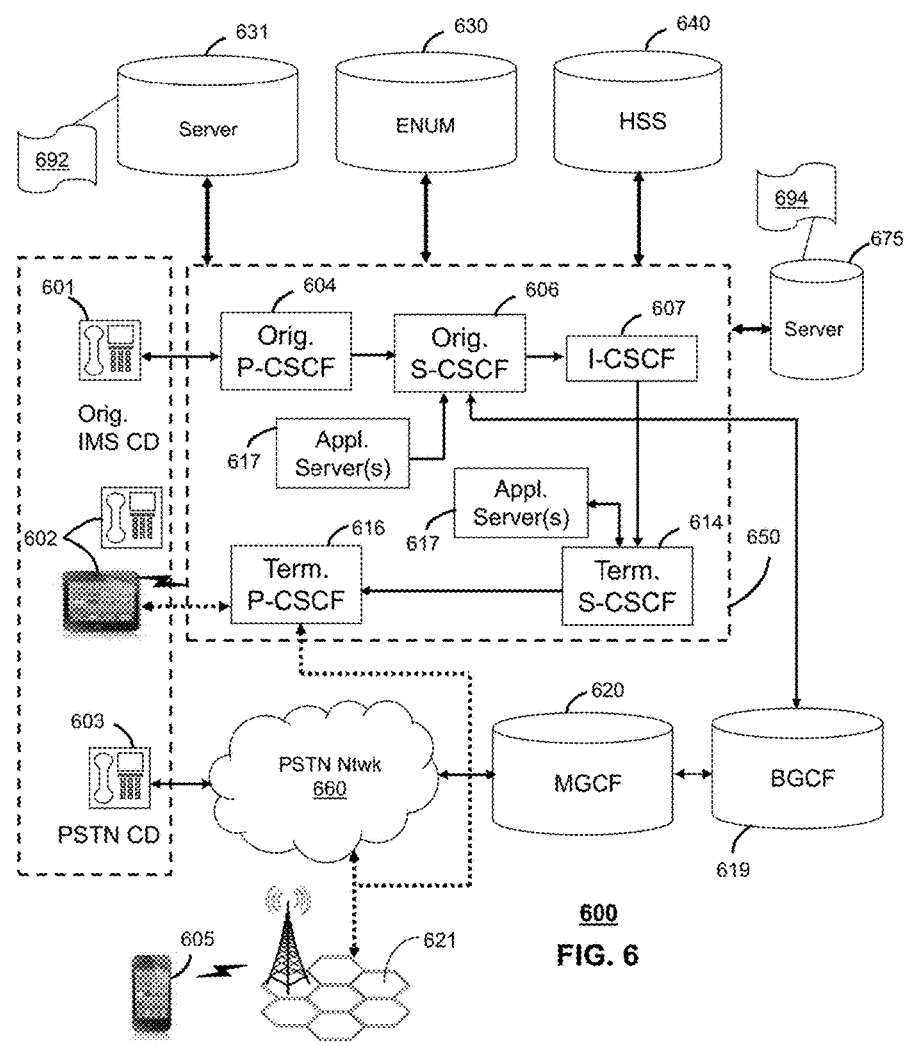
FIG. 6 depicts an illustrative embodiment of a communication system that provides communication services including data communications to an application server.

FIG. 6 depicts an illustrative embodiment of a communication system 600 employing an IP Multimedia Subsystem (IMS) network architecture to facilitate the combined services of circuit-switched and packet-switched systems. Communication system 600 can be overlaid or operably coupled with one or more of systems 100-400 as another representative embodiment of communication system 600. For instance, communication system 600 can provide for: allocating virtual network function resources for a wireless connection with a gateway device; facilitating establishing the wireless connection with the gateway device utilizing the virtual network function resources to provide for transmitting of data from the gateway device to an application server; and/or tearing down the virtual network function resources responsive to a determination that the transmitting of the data from the gateway device to the application server via the wireless connection has been completed. In one or more embodiments, the data can include sensor information captured by sensors of a group of communication devices that communicated the sensor information to the gateway device, and the data can be stored by the gateway device until a determination is made that a threshold associated with the data has been satisfied. In one or more embodiments, the allocating of the virtual network function resources establishes a virtual dedicated Serving-Packet Data Network Gateway for the wireless connection. In one or more embodiments, the wireless connection is a Long Term Evolution connection. In one or more embodiments, the wireless connection is a Long Term Evolution in Unlicensed spectrum connection. In one or more embodiments, the allocating of the virtual network function resources establishes a virtual dedicated evolved Packet Data Gateway for the wireless connection, and the wireless connection is a WiFi connection.

In one or more embodiments, the method can include monitoring for an undesired condition associated with a pre-configured connection between the gateway device and the application server, where the allocating of the virtual network function resources for the wireless connection with the gateway device is responsive to a detection of the undesired condition. In one or more embodiments, the method can include prioritizing the allocating of the virtual network function resources for the wireless connection with the gateway device over a request for allocation of the virtual network function resources for another wireless connection with another gateway device. In one or more embodiments, the method can include receiving threshold data from the gateway device, where the threshold data is associated with receiving and storing of the data by the gateway device; analyzing the threshold data; determining whether the threshold data indicates that the threshold has been satisfied; and responsive to a determination that the threshold data indicates that the threshold has been satisfied, transmitting an instruction to the gateway device to transmit the data via the wireless connection.

Communication system 600 can include various components which may be virtual machines or non-virtual machines. For example system 600 can include a Home Subscriber Server (HSS) 640, a tElephone NUmber Mapping (ENUM) server 630, and other network elements of an IMS network 650. The IMS network 650 can establish communications between IMS-compliant communication devices (CDs) 601, 602, Public Switched Telephone Network (PSTN) CDs 603, 605, and combinations thereof by way of a Media Gateway Control Function (MGCF) 620 coupled to a PSTN network 660. The MGCF 620 need not be used when a communication session involves IMS CD to IMS CD communications. A communication session involving at least one PSTN CD may utilize the MGCF 620.

IMS CDs 601, 602 can register with the IMS network 650 by contacting a Proxy Call Session Control Function (P-CSCF) which communicates with an interrogating CSCF (I-CSCF), which in turn, communicates with a Serving CSCF (S-CSCF) to register the CDs with the HSS 640. To initiate a communication session between CDs, an originating IMS CD 601 can submit a Session Initiation Protocol (SIP INVITE) message to an originating P-CSCF 604 which communicates with a corresponding originating S-CSCF 606. The originating S-CSCF 606 can submit the SIP INVITE message to one or more application servers (ASs) 617 that can provide a variety of services to IMS subscribers.

For example, the application servers 617 can be used to perform originating call feature treatment functions on the calling party number received by the originating S-CSCF 606 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 606 can submit queries to the ENUM system 630 to translate an E.164 telephone number in the SIP INVITE message to a SIP Uniform Resource Identifier (URI) if the terminating communication device is IMS-compliant. The SIP URI can be used by an Interrogating CSCF (I-CSCF) 607 to submit a query to the HSS 640 to identify a terminating S-CSCF 614 associated with a terminating IMS CD such as reference 602. Once identified, the I-CSCF 607 can submit the SIP INVITE message to the terminating S-CSCF 614. The terminating S-CSCF 614 can then identify a terminating P-CSCF 616 associated with the terminating CD 602. The P-CSCF 616 may then signal the CD 602 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 6 may be interchangeable. It is further noted that communication system 600 can be adapted to support video conferencing.

If the terminating communication device is instead a PSTN CD such as CD 603 or CD 605 (in instances where the cellular phone only supports circuit-switched voice communications), the ENUM system 630 can respond with an unsuccessful address resolution which can cause the originating S-CSCF 606 to forward the call to the MGCF 620 via a Breakout Gateway Control Function (BGCF) 619. The MGCF 620 can then initiate the call to the terminating PSTN CD over the PSTN network 660 to enable the calling and called parties to engage in voice and/or data communications.

It is further appreciated that the CDs of FIG. 6 can operate as wireline or wireless devices. For example, the CDs of FIG. 6 can be communicatively coupled to a cellular base station 621, a femtocell, a WiFi router, a Digital Enhanced Cordless Telecommunications (DECT) base unit, or another suitable wireless access unit to establish communications with the IMS network 650 of FIG. 6. The cellular access base station 621 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 6.

Cellular phones supporting LTE can support packet-switched voice and packet-switched data communications and thus may operate as IMS-compliant mobile devices. In this embodiment, the cellular base station 621 may communicate directly with the IMS network 650 as shown by the arrow connecting the cellular base station 621 and the P-CSCF 616.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The server 631 can be operably coupled to communication system 600 for purposes similar to the gateway device 110 described above. Server 631 can perform function 692 and thereby provide IoT data aggregation and storage services. Function 692 can include receiving data from a group of communication devices; determining whether the data is time-sensitive; responsive to a determination that the data is not time-sensitive, storing the data in memory; and responsive to a determination that a threshold associated with the receiving and storing of the data has been satisfied, transmitting the data over a wireless connection to an application server.

A server 675 can be utilized to execute an orchestration engine, which can be adapted with software to perform function 694 which can include allocating virtual network function resources for a wireless connection with a gateway device; facilitating establishing the wireless connection with the gateway device utilizing the virtual network function resources to provide for transmitting of data from the gateway device to an application server; and tearing down the virtual network function resources responsive to a determination that the transmitting of the data from the gateway device to the application server via the wireless connection has been completed. In one embodiment, server 675 can be an integral part of the application server(s) 617.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 7:
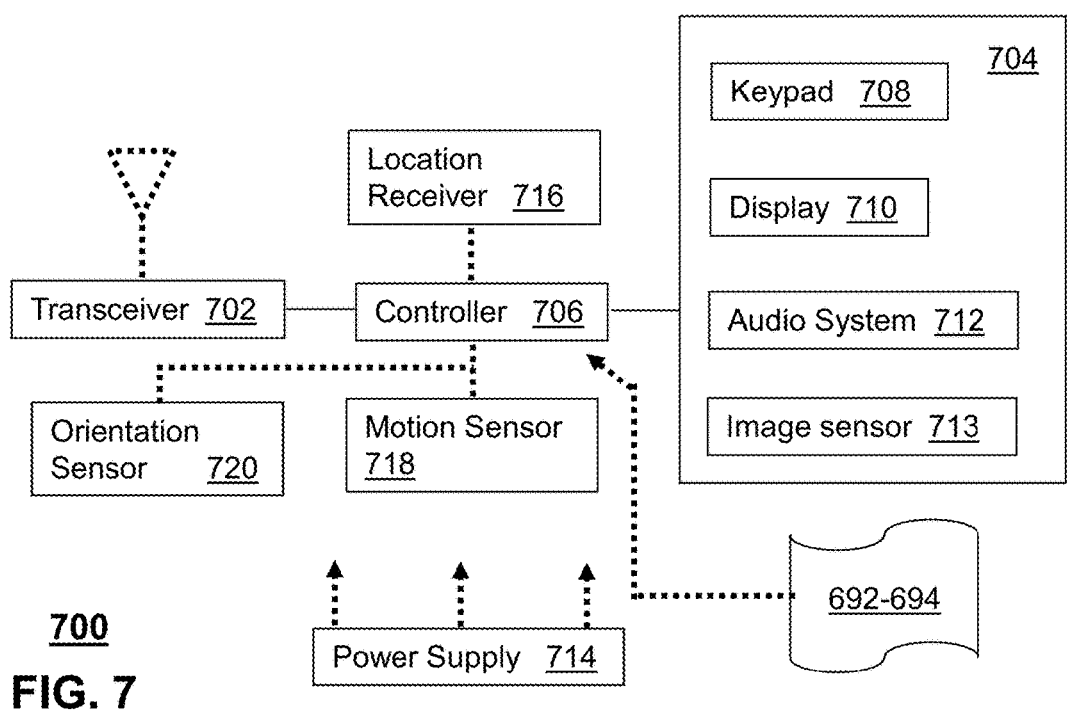
FIG. 7 depicts an illustrative embodiment of a communication device.

FIG. 7 depicts an illustrative embodiment of a communication device 700. Communication device 700 can serve in whole or in part as an illustrative embodiment of the devices depicted in systems 100-400 and 600 of FIGS. 1-4 and 6 and can be configured to perform portions of method 500 of FIG. 5. As an example, communication device 700 can receive data from a group of communication devices; determine whether the data is time-sensitive; responsive to a determination that the data is not time-sensitive, store the data in a memory; and/or responsive to a determination that a threshold associated with the receiving and storing of the data has been satisfied, transmit the data over a wireless connection to an application server. In one embodiment, the wireless connection can be established by a network device by allocating virtual network function resources for the wireless connection. In another embodiment, the network device can tear down the virtual network function resources responsive to a determination that the transmitting of the data has been completed. In one embodiment, the data can include sensor information captured by sensors of the group of communication devices, where the data comprises groups of the data, and where the communication device 700 prioritizes an order of delivery via the wireless connection for the groups of the data. In one embodiment, the communication device 700 can monitor for an undesired condition associated with a pre-configured connection between the processing system and the application server, where the storing the data in the memory and the transmitting the data over the wireless connection are responsive to a detection of the undesired condition. In one embodiment, the determination that the threshold has been satisfied is based on monitoring Input/Output Operations Per Second information.

Communication device 700 can comprise a wireline and/or wireless transceiver 702 (herein transceiver 702), a user interface (UI) 704, a power supply 714, a location receiver 716, a motion sensor 718, an orientation sensor 720, and a controller 706 for managing operations thereof. The transceiver 702 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 702 can also be adapted to support circuit-switched wireline access technologies (such as PSTN), packet-switched wireline access technologies (such as TCP/IP, VoIP, etc.), and combinations thereof.

The UI 704 can include a depressible or touch-sensitive keypad 708 with a navigation mechanism such as a roller ball, a joystick, a mouse, or a navigation disk for manipulating operations of the communication device 700. The keypad 708 can be an integral part of a housing assembly of the communication device 700 or an independent device operably coupled thereto by a tethered wireline interface (such as a USB cable) or a wireless interface supporting for example Bluetooth®. The keypad 708 can represent a numeric keypad commonly used by phones, and/or a QWERTY keypad with alphanumeric keys. The UI 704 can further include a display 710 such as monochrome or color LCD (Liquid Crystal Display), OLED (Organic Light Emitting Diode) or other suitable display technology for conveying images to an end user of the communication device 700.

In an embodiment where the display 710 is touch-sensitive, a portion or all of the keypad 708 can be presented by way of the display 710 with navigation features.

The display 710 can use touch screen technology to also serve as a user interface for detecting user input. As a touch screen display, the communication device 700 can be adapted to present a user interface with graphical user interface (GUI) elements that can be selected by a user with a touch of a finger. The touch screen display 710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 710 can be an integral part of the housing assembly of the communication device 700 or an independent device communicatively coupled thereto by a tethered wireline interface (such as a cable) or a wireless interface.

The UI 704 can also include an audio system 712 that utilizes audio technology for conveying low volume audio (such as audio heard in proximity of a human ear) and high volume audio (such as speakerphone for hands free operation). The audio system 712 can further include a microphone for receiving audible signals of an end user. The audio system 712 can also be used for voice recognition applications. The UI 704 can further include an image sensor 713 such as a charged coupled device (CCD) camera for capturing still or moving images.

The power supply 714 can utilize common power management technologies such as replaceable and rechargeable batteries, supply regulation technologies, and/or charging system technologies for supplying energy to the components of the communication device 700 to facilitate long-range or short-range portable applications. Alternatively, or in combination, the charging system can utilize external power sources such as DC power supplied over a physical interface such as a USB port or other suitable tethering technologies.

The location receiver 716 can utilize location technology such as a global positioning system (GPS) receiver capable of assisted GPS for identifying a location of the communication device 700 based on signals generated by a constellation of GPS satellites, which can be used for facilitating location services such as navigation. The motion sensor 718 can utilize motion sensing technology such as an accelerometer, a gyroscope, or other suitable motion sensing technology to detect motion of the communication device 700 in three-dimensional space. The orientation sensor 720 can utilize orientation sensing technology such as a magnetometer to detect the orientation of the communication device 700 (north, south, west, and east, as well as combined orientations in degrees, minutes, or other suitable orientation metrics).

The communication device 700 can use the transceiver 702 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 700.

Other components not shown in FIG. 7 can be used in one or more embodiments of the subject disclosure. For instance, the communication device 700 can include a reset button (not shown). The reset button can be used to reset the controller 706 of the communication device 700. In yet another embodiment, the communication device 700 can also include a factory default setting button positioned, for example, below a small hole in a housing assembly of the communication device 700 to force the communication device 700 to re-establish factory settings. In this embodiment, a user can use a protruding object such as a pen or paper clip tip to reach into the hole and depress the default setting button. The communication device 700 can also include a slot for adding or removing an identity module such as a Subscriber Identity Module (SIM) card. SIM cards can be used for identifying subscriber services, executing programs, storing subscriber data, and so forth.

The communication device 700 as described herein can operate with more or less of the circuit components shown in FIG. 7. These variant embodiments can be used in one or more embodiments of the subject disclosure.

The communication device 700 can be adapted to perform the functions of gateway device 110, communication device 115, application server 120, sensor 125, orchestration engine 175, or other devices described herein. It will be appreciated that the communication device 700 can also represent other devices that can operate in systems 100-400 and 600. In addition, the controller 706 can be adapted in various embodiments to perform the functions 692-694, respectively.

Upon reviewing the aforementioned embodiments, it would be evident to an artisan with ordinary skill in the art that said embodiments can be modified, reduced, or enhanced without departing from the scope of the claims described below. For example, the orchestration engine 175 can instantiate application server 120 for receiving the data from the gateway device 110. In one embodiment, the orchestration engine 175 can poll the gateway device 110 for information that is then utilized for determining whether an instantiation trigger and/or transmitting trigger has been satisfied. In another embodiment, the orchestration engine 175 can monitor performance of gateway devices 110 and can manage workload accordingly. For example, the orchestration engine 175 can determine that a particular gateway device 110 is not operating near its storage capacity and can instruct IoT devices to forward data to that particular gateway device for aggregation of data. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 8:
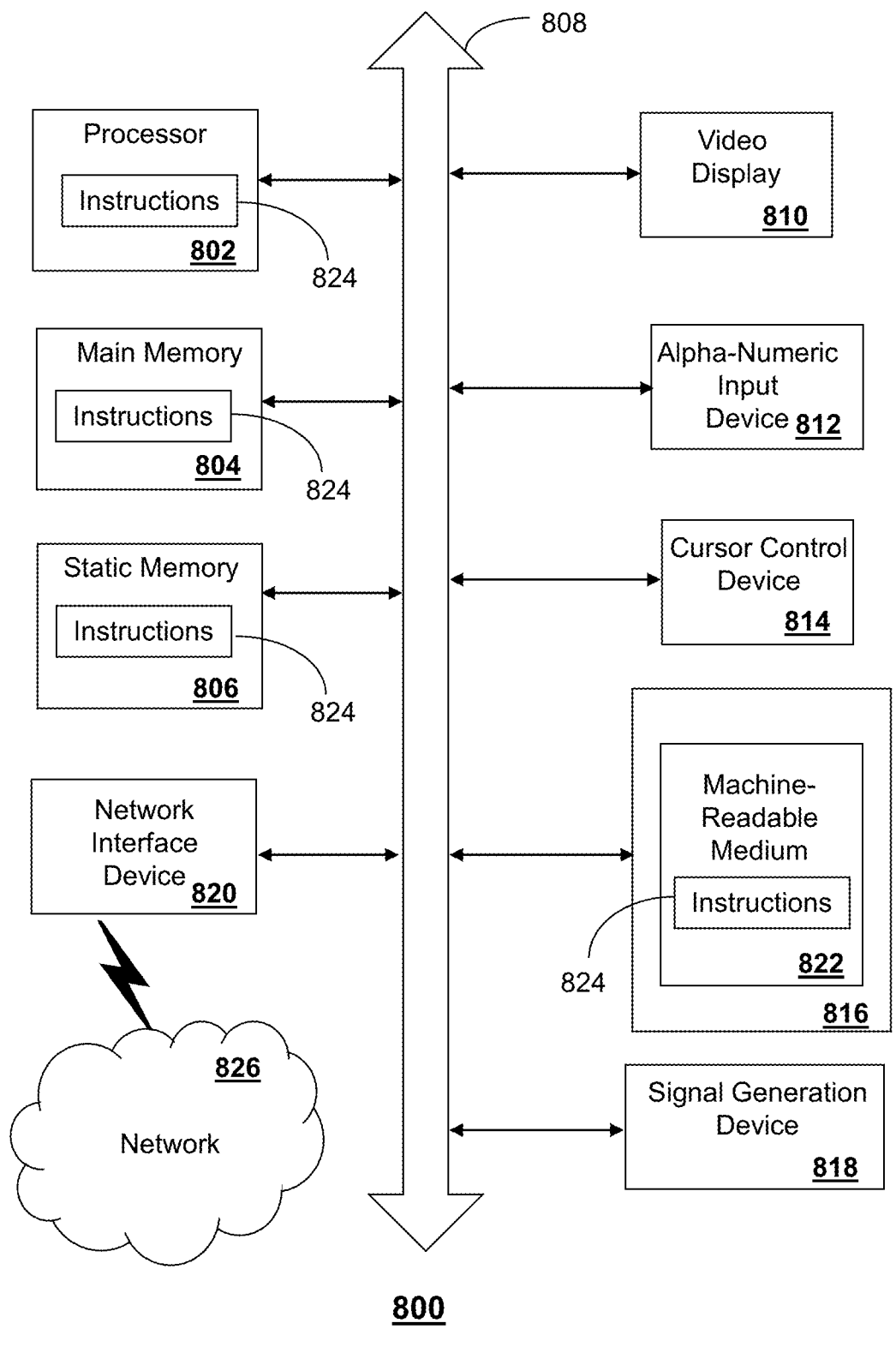
FIG. 8 is a diagrammatic representation of a machine in the form of a computer system within which a set of instructions, when executed, may cause the machine to perform any one or more of the methods described herein.

FIG. 8 depicts an exemplary diagrammatic representation of a machine in the form of a computer system 800 within which a set of machine-readable instructions, when executed, may cause the machine to perform any one or more of the methods described above. One or more instances of the machine can operate, for example, as the gateway device 110, the communication devices 115, the orchestration engine 175, and other devices of FIGS. 1-4 and 6-7. In some embodiments, the machine may be connected (e.g., using a network 826) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor (or controller) 802 (e.g., a central processing unit (CPU)), a graphics processing unit (GPU, or both), a main memory 804 and a static memory 806, which communicate with each other via a bus 808. The computer system 800 may further include a display unit 810 (e.g., a liquid crystal display (LCD), a flat panel, or a solid state display). The computer system 800 may include an input device 812 (e.g., a keyboard), a cursor control device 814 (e.g., a mouse), a disk drive unit 816, a signal generation device 818 (e.g., a speaker or remote control) and a network interface device 820. In distributed environments, the embodiments described in the subject disclosure can be adapted to utilize multiple display units 810 controlled by two or more computer systems 800. In this configuration, presentations described by the subject disclosure may in part be shown in a first of the display units 810, while the remaining portion is presented in a second of the display units 810.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 822 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 800. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A gateway device, comprising:
a processing system including a processor; and
a memory that stores executable instructions that, when executed by the processing system, facilitate performance of operations, comprising:
receiving data from a group of communication devices, the data including sensor information captured by sensors of the group of communication devices;
determining whether the data is time-sensitive;
responsive to a determination that the data is not time-sensitive, storing the data in the memory;
providing information associated with the receiving and storing of the data to a network device;
receiving an instruction from the network device that a threshold associated with the receiving and storing of the data has been satisfied; and
transmitting the data over a wireless connection to an application server, wherein the wireless connection is established by the network device initiating setting up allocated virtual network function resources for the wireless connection responsive to the threshold being satisfied, and wherein the network device tears down the allocated virtual network function resources responsive to a completion of the transmitting of the data.

2. The gateway device of claim 1, wherein the data comprises groups of the data, and wherein the operations further comprise prioritizing an order of delivery via the wireless connection for the groups of the data.

3. The gateway device of claim 1, wherein the determination that the threshold has been satisfied is based on monitoring Input/Output Operations Per Second information.

4. The gateway device of claim 1, wherein the allocated virtual network function resources establish a virtual dedicated Serving-Packet Data Network Gateway for the wireless connection, and wherein the processing system comprises a plurality of processors operating in a distributed processing environment.

5. The gateway device of claim 1, wherein the allocated virtual network function resources establish a virtual dedicated evolved Packet Data Gateway for the wireless connection, and wherein the wireless connection comprises a WiFi connection.

6. The gateway device of claim 1, wherein the receiving the data from the group of communication devices is based on communications according to a Low Power Wide Area Network (LPWAN) specification.

7. The gateway device of claim 1, wherein the operations further comprise:
monitoring for an undesired condition associated with a pre-configured connection between the gateway device and the application server, wherein the storing the data in the memory and the transmitting the data over the wireless connection are responsive to a detection of the undesired condition.

8. The gateway device of claim 1, wherein the determination that the threshold associated with the receiving and storing of the data has been satisfied is based on the instruction received from the network device, and wherein the operations further comprise providing storage capacity data to the network device.

9. A method, comprising:
receiving, by a processing system including a processor, information on reception and storage of data in a gateway device;
allocating, by a processing system, virtual network function resources for a wireless connection with the gateway device, responsive to a determination that a threshold associated with the information on reception and storage of data in the gateway device has been satisfied;
facilitating establishment, by the processing system, of the wireless connection with the gateway device utilizing the virtual network function resources to provide for transmitting of data from the gateway device to an application server, wherein the data includes sensor information captured by sensors of a group of communication devices that communicated the sensor information to the gateway device; and
tearing down, by the processing system, the virtual network function resources responsive to a determination that the transmitting of the data from the gateway device to the application server via the wireless connection has been completed.

10. The method of claim 9, wherein the allocating of the virtual network function resources establishes a virtual dedicated Serving-Packet Data Network Gateway for the wireless connection.

11. The method of claim 10, wherein the wireless connection comprises one of a Long Term Evolution connection or a Long Term Evolution in Unlicensed spectrum connection.

12. The method of claim 10, wherein the allocating the virtual network function resources for the wireless connection is responsive to another determination that another threshold associated with the data has been satisfied.

13. The method of claim 9, wherein the allocating the virtual network function resources establishes a virtual dedicated evolved Packet Data Gateway for the wireless connection, and wherein the wireless connection comprises a WiFi connection.

14. The method of claim 9, comprising:
monitoring, by the processing system, for an undesired condition associated with a pre-configured connection between the gateway device and the application server, wherein the allocating the virtual network function resources for the wireless connection with the gateway device is responsive to a detection of the undesired condition.

15. The method of claim 9, comprising:
prioritizing, by the processing system, the allocating the virtual network function resources for the wireless connection with the gateway device over a request for allocation of the virtual network function resources for another wireless connection with another gateway device.

16. The method of claim 9, comprising:
receiving, by the processing system, threshold data from the gateway device, wherein the threshold data is associated with receiving and storing of the data by the gateway device;
analyzing, by the processing system, the threshold data;
determining whether the threshold data indicates that the threshold has been satisfied; and
responsive to the determination that the threshold data indicates that the threshold has been satisfied, transmitting an instruction to the gateway device to transmit the data via the wireless connection.

17. A non-transitory machine-readable storage medium, comprising executable instructions that, when executed by a processing system including a processor, facilitate performance of operations, comprising:
receiving data from a group of communication devices;
determining whether the data is time-sensitive;
responsive to a determination that the data is not time-sensitive, storing the data in a memory;
providing information associated with the receiving and storing of the data to a network device; and
receiving an instruction from the network device that a threshold associated with the receiving and storing of the data has been satisfied, transmitting the data over a wireless connection to an application server, wherein the wireless connection is established by the network device setting up and allocating virtual network function resources for the wireless connection responsive to the threshold being satisfied, and wherein the network device tears down the virtual network function resources responsive to a determination that the transmitting of the data has been completed.

18. The non-transitory machine-readable storage medium of claim 17, wherein the data includes sensor information captured by sensors of the group of communication devices, wherein the data comprises groups of the data, and wherein the operations further comprise prioritizing an order of delivery via the wireless connection for the groups of the data.

19. The non-transitory machine-readable storage medium of claim 17, wherein the operations further comprise:
monitoring for an undesired condition associated with a pre-configured connection between the processing system and the application server, wherein the storing the data in the memory and the transmitting the data over the wireless connection are responsive to a detection of the undesired condition.

20. The non-transitory machine-readable storage medium of claim 17, wherein the determination that the threshold has been satisfied is based on monitoring Input/Output Operations Per Second information, and wherein the processing system comprises a plurality of processors operating in a distributed processing environment.

* * * * *